United States Patent
Nakano et al.

(10) Patent No.: US 6,530,703 B2
(45) Date of Patent: Mar. 11, 2003

(54) FOCAL-PLANE SHUTTER HAVING RESILIENT STOPPING MEMBERS FOR SHUTTER BLADES

(75) Inventors: Yoichi Nakano, Narashino (JP); Hiroshi Takahashi, Narashino (JP)

(73) Assignee: Seiko Precision Inc. (JP)

( * ) Notice: Subject to any disclaimer, the term of this patent is extended or adjusted under 35 U.S.C. 154(b) by 0 days.

(21) Appl. No.: 10/079,156

(22) Filed: Feb. 20, 2002

(65) Prior Publication Data

US 2002/0114628 A1 Aug. 22, 2002

(30) Foreign Application Priority Data

Feb. 20, 2001 (JP) ......................................... 2001-042622

(51) Int. Cl.⁷ ................................................ G03B 9/40
(52) U.S. Cl. ........................................ 396/456; 396/484
(58) Field of Search ................................. 396/453, 454, 396/456, 483, 484, 485, 486, 487, 488, 489, 490, 491, 492

(56) References Cited

U.S. PATENT DOCUMENTS

| | | | | |
|---|---|---|---|---|
| 4,692,009 A | * | 9/1987 | Toyoda et al. | 396/456 |
| 4,847,649 A | * | 7/1989 | Toyoda et al. | 396/456 |
| 4,975,722 A | * | 12/1990 | Suzuki et al. | 396/456 |
| 5,034,765 A | * | 7/1991 | Nemoto et al. | 396/456 |
| 5,594,521 A | * | 1/1997 | Hasuda et al. | 396/453 |
| 5,664,247 A | * | 9/1997 | Hasuda et al. | 396/456 |

* cited by examiner

*Primary Examiner*—Alan A. Mathews
(74) *Attorney, Agent, or Firm*—Adams & Wilks

(57) ABSTRACT

A focal-plane shutter comprises a shutter plate having a shutter opening, opening blades and closing blades for opening and closing the shutter opening, and arms connected by connector portions to the opening and closing blades for driving the blades parallel to the shutter opening to effect an exposure. Resilient stopping members are disposed to make resilient contact with the opening blades at opening positions thereof where the opening blades are retracted from the shutter opening, and other resilient stopping members are disposed to make resilient contact with the closing blades at closing positions thereof where the closing blades close the shutter opening. The resilient stopping members are positioned on opposite sides of the connector portions so that when the blades strike the stopping members, reaction forces are produced which cancel each other out thereby preventing excessive wear of the connector portions.

20 Claims, 5 Drawing Sheets

FOCAL-PLANE SHUTTER HAVING RESILIENT STOPPING MEMBERS FOR SHUTTER BLADES

BACKGROUND OF THE INVENTION

1. Field of the Invention

The present invention relates generally to focal-plane shutters, and more particularly to focal-plane shutters having resilient stopping members for absorbing shutter blade impact forces without causing undue wear of the shutter blade connector portions.

2. Description of the Related Art

Japanese Utility Model Publication No. 34892/1981 discloses a known focal-plane shutter in which at least one stopping portion is mounted to a base plate to bring at least some of the closing blades and/or closure-assisting members to a stop. As shown in FIG. 5, a base plate 9 of this structure has bent portions forming stopping portions 9b, 9b which are brought into resilient contact with the front-end surface of a leading blade 6a of a set of closing blades 6a–6e via resilient members 10, 10. Although the stopping portions 9b, 9b are shown to be two in number, at least one stopping portion is provided.

In this known structure, there are provided two stopping portions 9b, 9b in the case shown in FIG. 5. The two stopping portions 9b, 9b are mounted to one side (i.e., the right side) of pivotal portions 7b and 8b which connect the leading blade 6a with closure-assisting members 7, 8 for driving the blade 6a. Therefore, when the leading blade 6a of the set of closing blades 6a–6e is moved by the spring force of a spring (not shown) and collides against the stopping portions 9b, 9b to close the shutter opening 2, the resulting impact forces exert a counterclockwise force on the pivotal portions 7b and 8b. Since this action is repeated each time the shutter is used, eccentric wear occurs on the pivotal portions 7b, 8b, producing rattling between the blade 6a and the pivotal portions 7b, 8b. This makes it impossible to hold the blade 6a stably and, consequently, the exposure accuracy deteriorates.

Furthermore, since the end surface of the blade 6a making resilient contact with the stopping portions 9b, 9b is an end surface that passes over the shutter opening 2 and forms the slit, wear is produced on the end surface that makes resilient contact with the stopping portions 9b, 9b as a result of repeated resilient contacts. As a result, a problem occurs in that the amount of exposure differs between the portions of the end surface of the blade 6a on which wear has occurred and the other non-worn portions, resulting in so-called image nonuniformity.

SUMMARY OF THE INVENTION

An object of the present invention is to provide a focal-plane shutter which overcomes the aforementioned drawbacks of prior art shutters.

Another object of the present invention is to provide a focal-plane shutter that prevents the application of unwanted forces to the connector portions connecting the shutter blades to the arms, thereby stabilizing the amount of exposure and improving the durability of the shutter.

A focal-plane shutter according to one embodiment of the present invention comprises a shutter plate having a shutter opening, a set of opening blades for opening and closing the shutter opening, and arms connected via connector portions to the opening blades for driving the opening blades parallel to the shutter opening. Resilient stopping members are provided for making resilient contact with the opening blades at opening positions where the opening blades are in a retracted state and open the shutter opening. The resilient stopping members are plural in number and make resilient contact with the opening blades on opposite sides of the connector portions.

A focal-plane shutter according to another embodiment of the present invention comprises a shutter plate having a shutter opening, a set of closing blades for opening and closing the shutter opening, and arms connected via connector portions to the closing blades for driving the closing blades parallel to the shutter opening. Resilient stopping members are provided for making resilient contact with the closing blades at closing positions where the closing blades close the shutter opening. The resilient stopping members are plural in number and make resilient contact with the closing blades on opposite sides of the connector portions. Since the resilient stopping members make resilient contact with the blades on opposite sides of the connector portions that connect the blades with the arms, impact forces produced when the blades collide against the resilient stopping members cancel out each other at the connector portions. Therefore no extra force acts on the connector portions, thereby enhancing the durability of the shutter.

According to another aspect of the present invention, the set of closing blades makes resilient contact with the resilient stopping members at portions thereof that do not traverse the shutter opening. This prevents damage to the end surface of the slit-forming blade that traverses the shutter opening and forms the slit. Thus the amount of exposure is not altered because of damage to the end surface of the slit-forming blade, even if the closing blades repeatedly collide against the resilient stopping members, thereby maintaining exposure accuracy and improving durability.

DETAILED DESCRIPTION OF THE PREFERRED EMBODIMENTS

One embodiment of the present invention is described with reference to the accompanying drawings.

Figure 1:
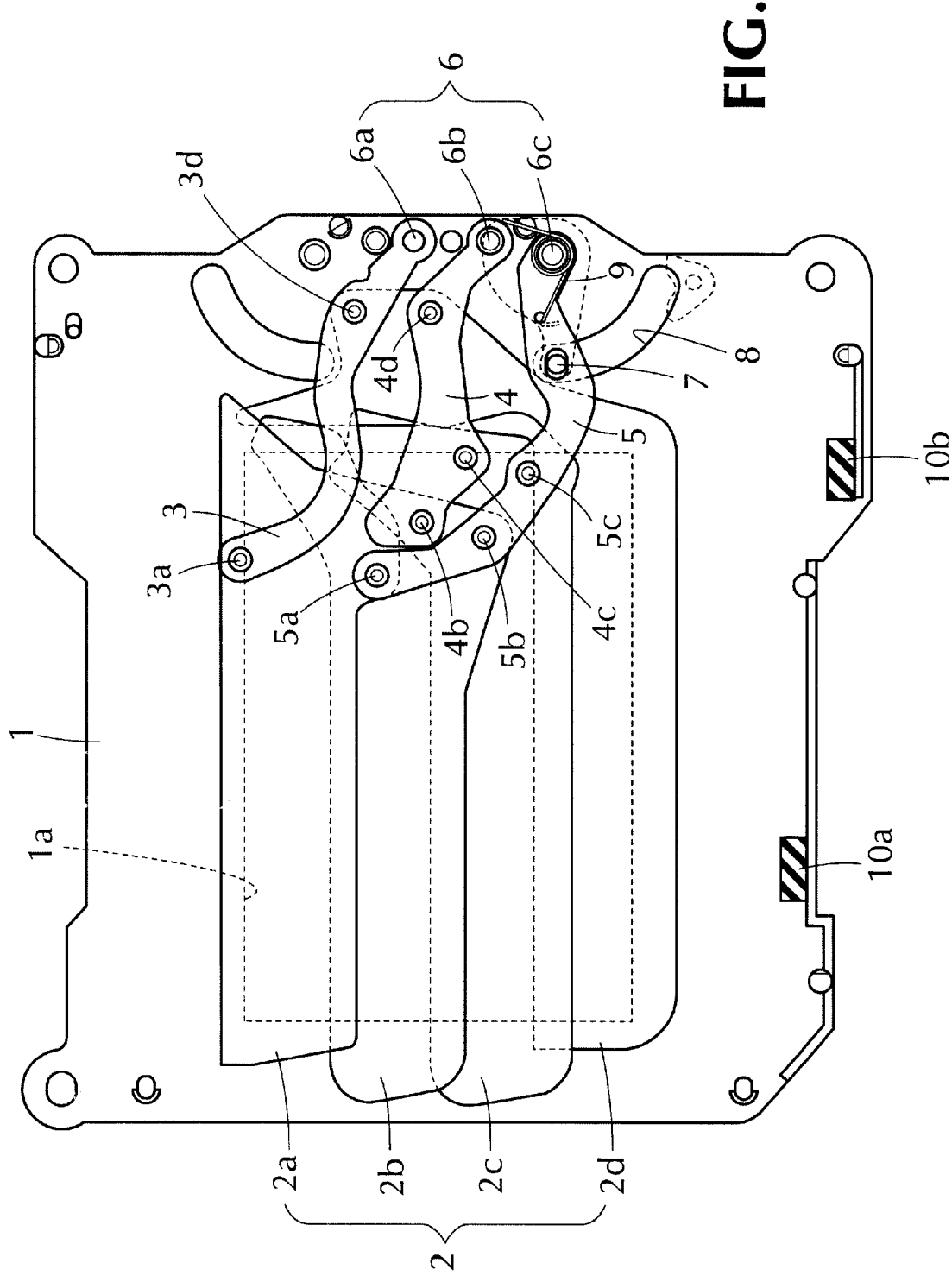
FIG. 1 is a front elevational view of one embodiment of a focal-plane shutter according to the present invention, showing a set of opening blades covering a shutter opening.
Figure 2:
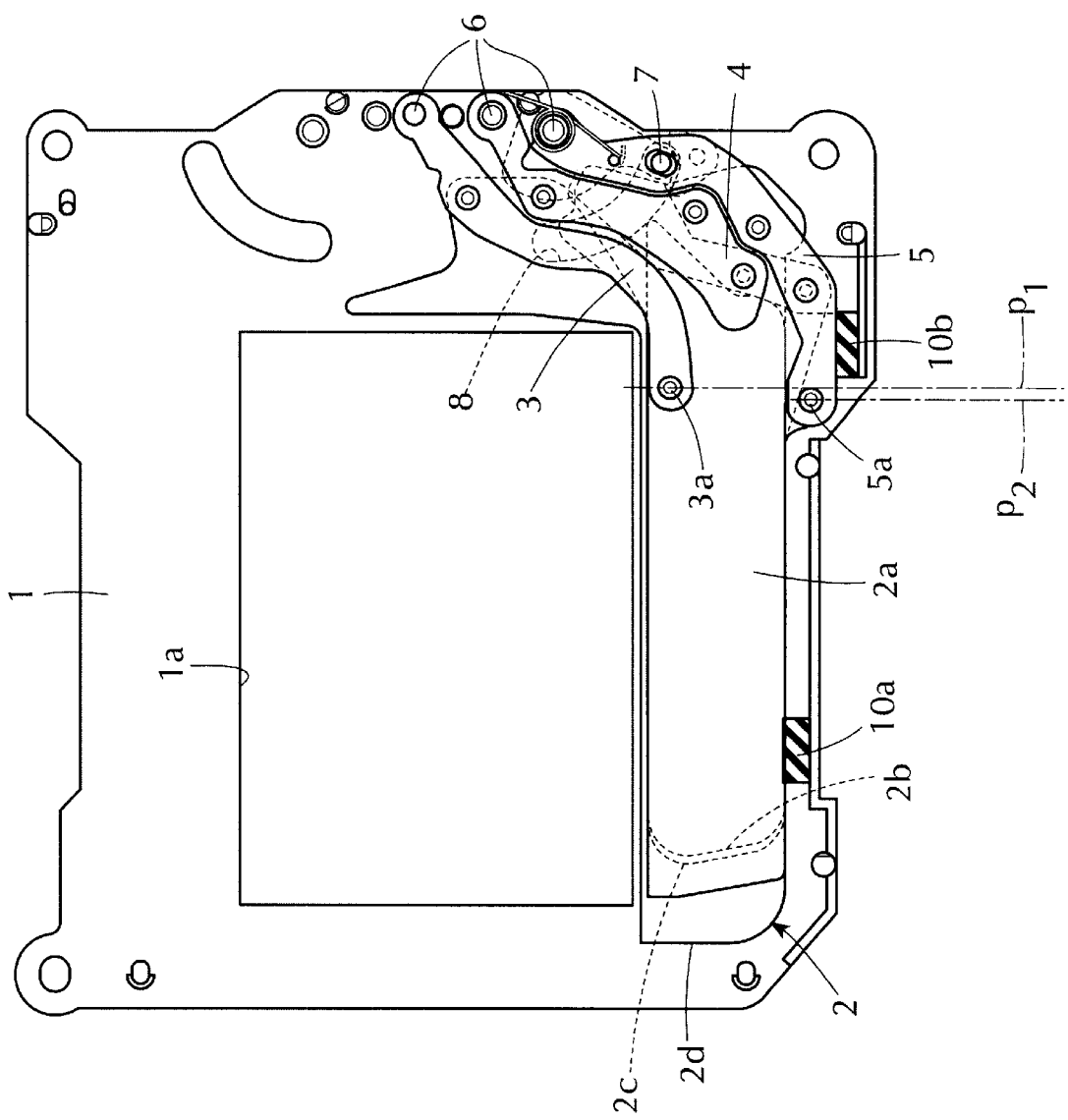
FIG. 2 is a front elevational view similar to FIG. 1, but showing the opening blades in retracted positions uncovering the shutter opening.

FIGS. 1 and 2 show a set of opening blades 2 of a parallel link type focal-plane shutter. A shutter plate 1 is provided with a shutter opening 1a. The opening blades 2 are displaceable to open and close the shutter opening 1a. The set of opening blades 2 is made up of four blades including a slit-forming blade 2a and three cover blades 2b–2d supported by three opening arms 3, 4 and 5. Shafts 6a, 6b and 6c are mounted at one side (right side in FIG. 1) of the shutter plate 1 and form the centers of swinging motions of the arms 3–5. The arms 3, 4 and 5 are pivotably mounted to the shafts 6a, 6b, and 6c, respectively. The opening blades 2a–2d are connected to the arms 3–5 by connector portions to form a parallel link mechanism. The slit-forming blade 2a is connected by connector portions 3a and 5a to the arms 3 and 5. The cover blade 2b is connected by connector portions 4b and 5b and the cover blade 2c is connected by connector portions 4c and 5c to the arms 4 and 5. Similarly, the cover blade 2d is connected by connector portions 3d and 4d to the arms 3 and 4.

A driving pin 7 extends upright from a driving lever (not shown) within the shutter driving mechanism and passes through a sectorial hole 8 formed in the shutter plate 1. The pin 7 has a narrowed front-end portion non-rotatably fitted in a small-sized fitting hole formed in the arm 5. Because the arm 5 receives a driving force from the shutter driving mechanism via the driving pin 7, the arm 5 acts as a driving arm for driving the set of opening blades 2. During manufacture, machining inevitably creates a slight clearance between the driving pin 7 and the fitting hole. To prevent rattling in this clearance, a biasing member such as a spring 9 is fitted over the shaft 6c. One end of the spring 9 is fastened to the driving arm 5, and the other end is secured to a spring fixing element mounted on the shutter plate 1.

As shown in FIG. 1, the opening blades 2 are in their expanded, fanned-out, shutter-closing positions where the blades 2 close or cover the shutter opening 1a. In response to a driving force exerted by the driving pin 7 on the arm 5, the arms 3–5 swing or pivot about the shafts 6a–6c, respectively, to drive the opening blades 2 downwardly while maintaining the blades 2 parallel to the shutter opening 1a to translate the blades 2 to their retracted, shutter-opening positions beneath the shutter opening 1a where the blades 2 open or uncover the shutter opening 1a (FIG. 2).

FIG. 2 shows the state in which the opening blades 2 have been translated downward and have reached their shutter-opening positions where the opening blades 2 are retracted beneath the shutter opening 1a. Two resilient stopping members 10a and 10b are mounted to the lower side of the shutter plate 1 at locations to make resilient contact with the lower edges or end surfaces of the opening blades 2 when the blades are in their opening positions where they are retracted from the shutter opening 1a.

The resilient stopping members 10a and 10b are located on opposite sides of the connector portions 3a and 5a in positions where the stopping members make resilient contact with the opening blades 2. More specifically, in this embodiment the resilient stopping members 10a and 10b are located on opposite sides of the connector portions 3a and 5a (i.e., laterally spaced from the connector portions 3a and 5a), with respect to imaginary planes $P_1$ and $P_2$ passing through the connector portions 3a and 5a and extending parallel to the displacement direction (vertical direction in FIGS. 1–2) of the opening blades 2, when the blades 2 are in the shutter-opening position (FIG. 2). As shown in FIG. 2, the resilient stopping member 10a is laterally spaced to the left of imaginary planes $P_1$ and $P_2$ and the resilient stopping member 10b is laterally spaced to the right of imaginary planes $P_1$ and $P_2$. As noted above, the connecting portions 3a and 5a connect the slit-forming blade 2a with the arms 3 and 5. Therefore, when the blades 2 move into resilient contact with the resilient stopping members 10a and 10b, the resilient contact with the resilient stopping member 10a produces an impact force which exerts a clockwise (rightward) rotating force on the connector portions 3a and 5a. On the other hand, resilient contact with the resilient stopping member 10b produces an impact force that exerts a counterclockwise (leftward) rotating force on the connector portions 3a and 5a. Consequently, the rightward rotating force and the leftward rotating force cancel out each other at the connector portions 3a and 5a. As a result, no substantial extra force acts on the connector portions 3a and 5a at the conclusion of the opening movement of the opening blades 2, thereby reducing if not eliminating eccentric wear of the connector portions 3a and 5a which would otherwise be produced. This is useful in enhancing the durability of the connector portions 3a and 5a.

Figure 3:
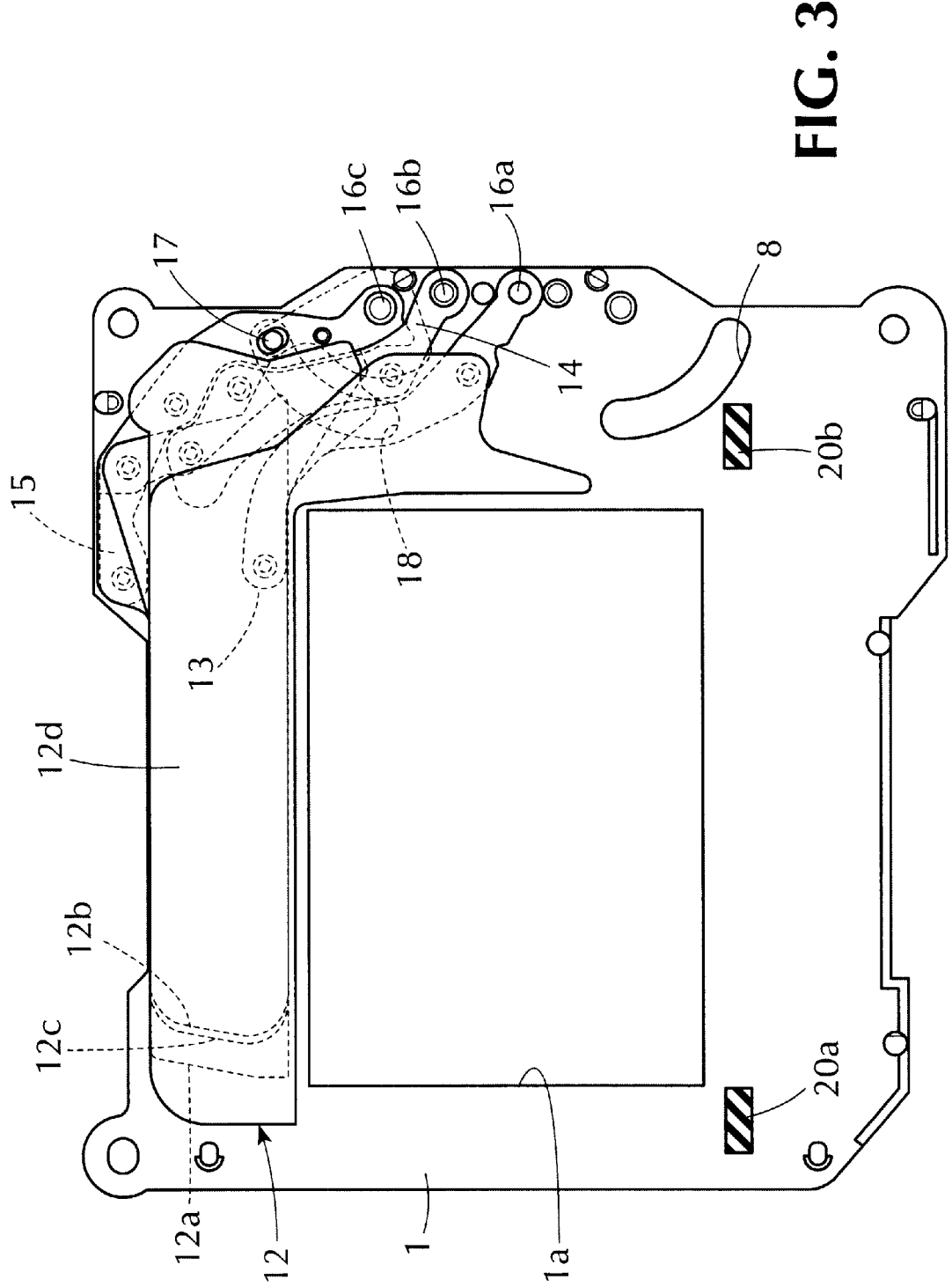
FIG. 3 is a front elevational view similar to FIG. 1, showing a set of closing blades in retracted positions uncovering the shutter opening.
Figure 4:
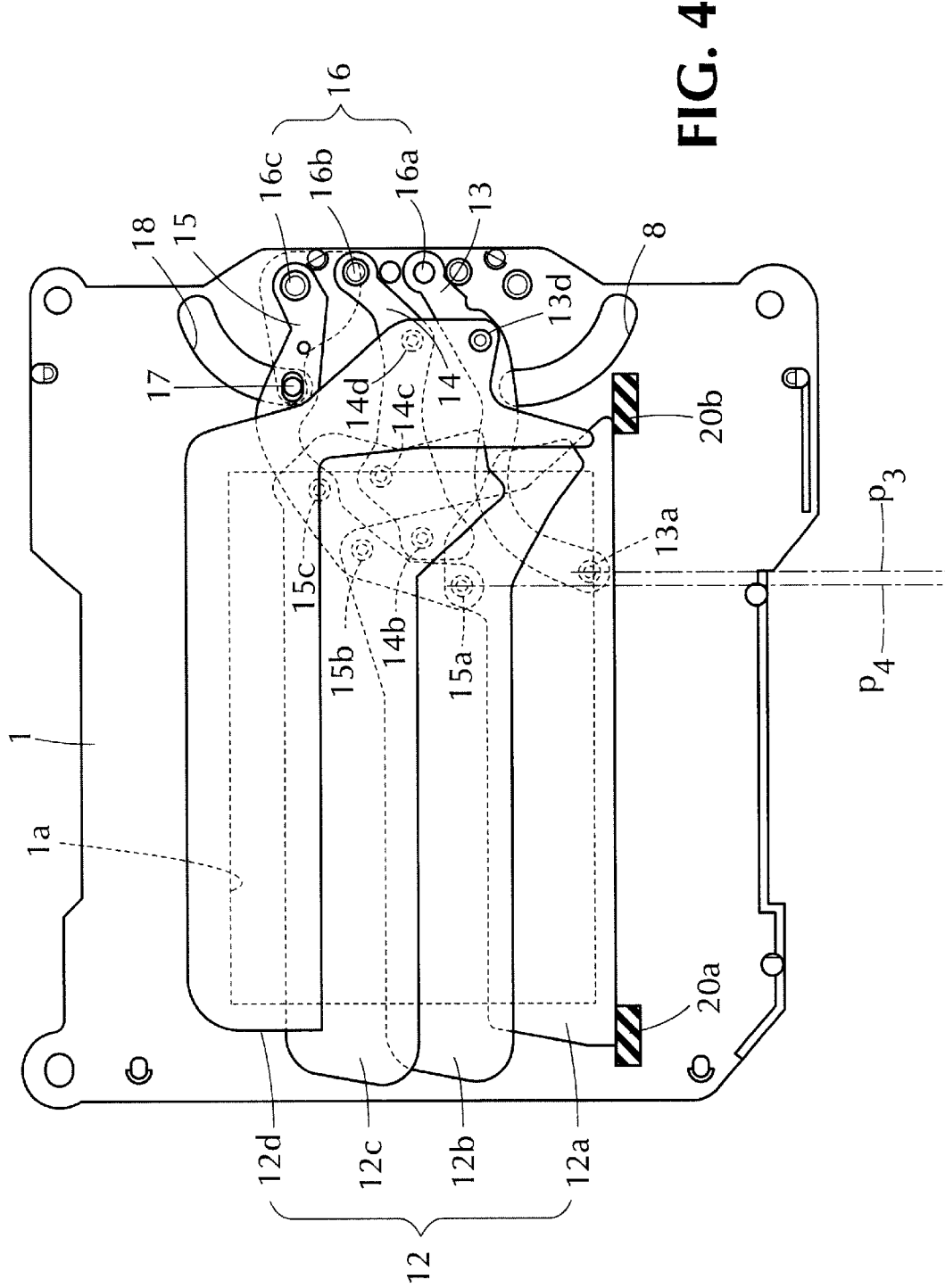
FIG. 4 is a front elevational view similar to FIG. 3, but showing the closing blades covering the shutter opening.
Figure 5:
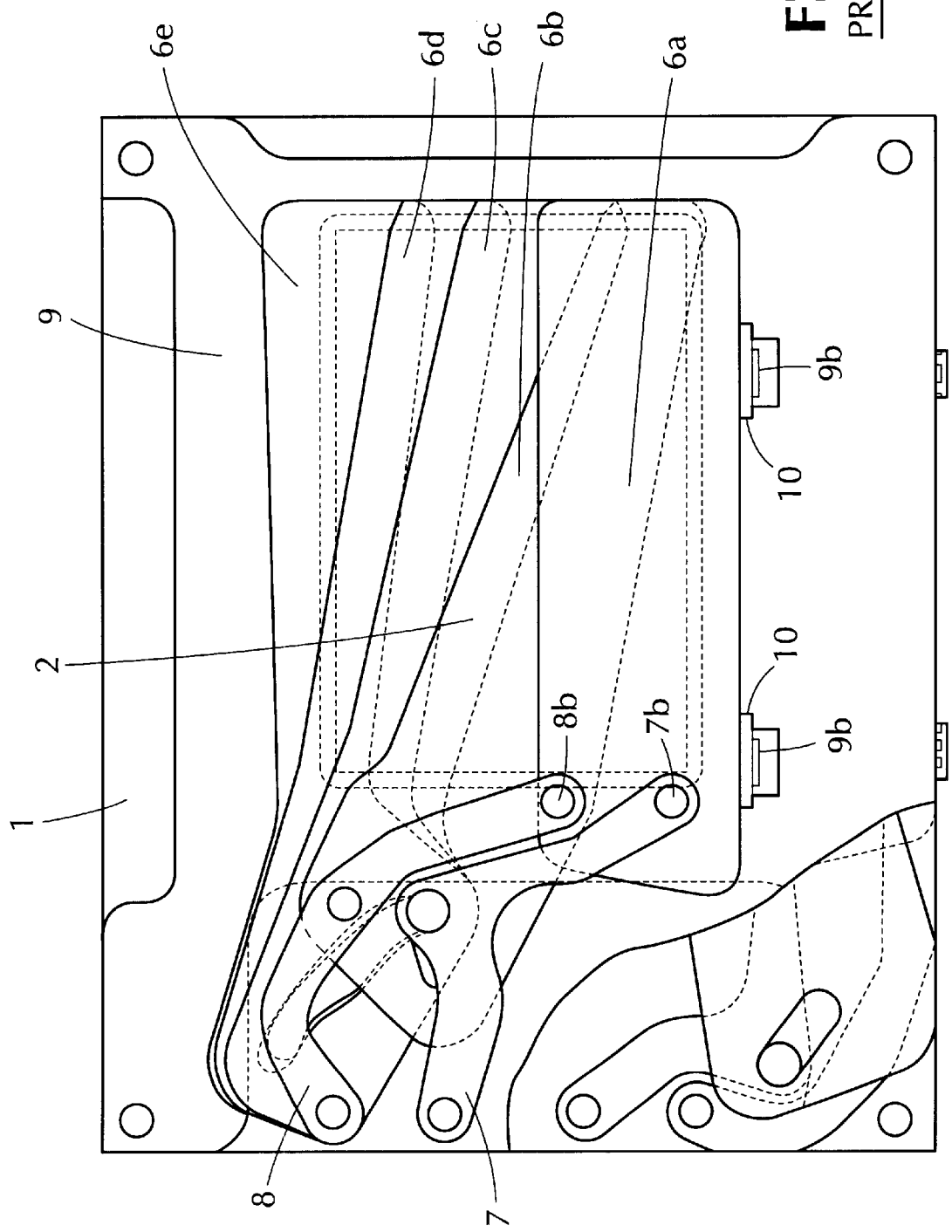
FIG. 5 is a front elevational view of a set of closing blades in a prior art shutter, showing the closing blades covering a shutter opening.

FIGS. 3 and 4 show a set of closing blades 12 of the parallel link type focal-plane shutter. FIG. 3 shows the state in which the closing blades 12 are retracted above the shutter opening 1a. The set of closing blades 12 is disposed on the shutter plate 1 with a partition plate (not shown) between the set of closing blades 12 and the set of opening blades 2. The set of closing blades 12 is substantially identical in structure with the set of opening blades 2. Four blades made up of a slit-forming blade 12a and three cover blades 12b–12d are supported by three closing arms 13, 14 and 15. The arms 13–15 are swingably mounted to shafts 16a, 16b and 16c which are mounted at one side (right side in FIG. 3) of the shutter plate 1, in the same way as the opening arms 3–5. The closing blades 12a–12d are connected to the arms 13–15 by connector portions to form a parallel link mechanism, in the same way as the opening blades 2. The slit-forming blade 12a is connected by connector portions 13a and 15a to the arms 13 and 15. The cover blade 12b is connected by connector portions 14b and 15b and the cover blade 12c is connected by connector portions 14c and 15c to the arms 14 and 15. Similarly, the cover blade 12d is connected by connector portions 13d and 14d to the arms 13 and 14.

A driving pin 17 extends upright from a driving lever (not shown) in the shutter drive mechanism and passes through a sectorial hole 18 formed in the shutter plate 1. The pin 17 has a narrowed front-end portion non-rotatably fitted in a small-sized fitting hole formed in the arm 15. In use of the shutter, the arm 15 receives a driving force from the shutter driving mechanism via the driving pin 17, and the arm 15 acts as a driving arm for driving the set of closing blades 12. To prevent rattling of the driving pin 17 in the fitting hole of the arm 15 in the same way as in the case of the driving pin 7, a spring (not shown) is fitted over the shaft 16c. One end of the spring is fastened to the arm 15, while the other end is secured to a spring fixing element mounted on the shutter plate 1.

As shown in FIG. 3, the closing blades 12 are in their retracted, shutter-opening positions where the blades 12 are disposed above the shutter opening 1a to thereby open or uncover the shutter opening. In response to a driving force exerted by the driving pin 17 on the arm 15, the arms 13–15 swing or pivot about the shafts 16a–16c, respectively, to drive the closing blades 12 downwardly while maintaining the blades 12 parallel to the shutter opening 1a to translate the blades 12 to their expanded, fanned-out, shutter-closing positions where the blades 12 close or cover the shutter opening 1a (FIG. 4).

FIG. 4 shows the state in which the closing blades 12 have been translated downward and have reached their shutter-closing positions where the closing blades are expanded and fanned out to cover the shutter opening 1a. Two resilient stopping members 20a and 20b are mounted to the lower side of the shutter opening 1a at positions to make resilient contact with the leading edges or end surfaces of the closing blades 12 when they move into their shutter-closing positions. The resilient stopping members 20a and 20b are mounted on the side either of a partition plate (not shown) or of a rear plate (not shown) so as not to impede opening/closing movement of the set of opening blades 2, and the resilient stopping members 20a and 20b are so positioned that they do not interfere with the traveling paths of the closing blades 2.

The resilient stopping members 20a and 20b make resilient contact with the lower edge or end surface of the slit-forming blade 12a on opposite sides of the connector portions 13a and 15a which connect the slit-forming blade 12a with the arms 13 and 15. More specifically, in this embodiment the resilient stopping members 20a and 20b are located on opposite sides of the connector portions 13a and 15a (i.e., laterally spaced from the connector portions 13a and 15a), with respect to imaginary planes $P_3$ and $P_4$ passing through the connector portions 13a and 15a and extending parallel to the displacement direction (vertical direction in FIGS. 3–4) of the closing blades 12, when the blades 12 are in the shutter-closing position (FIG. 4). As shown in FIG. 4, the resilient stopping member 20a is laterally spaced to the left of imaginary planes $P_3$ and $P_4$ and the resilient stopping member 20b is laterally spaced to the right of imaginary planes $P_3$ and $P_4$. Moreover, the resilient stopping members 20a and 20b are positioned outside of the center portion 12A of the lower edge or end surface of the slit-forming blade 12a to prevent the stopping member from making resilient contact with the center portion end surface 12A which translates over the shutter opening 1a.

More particularly, when the closing blades 12 translate from their retracted, shutter-open positions (FIG. 3) to their expanded, shutter-closing positions (FIG. 4), the lower edge or end surface of the slit-forming blade 12a maintains a parallel relationship with the lower edge of the shutter opening 1a to form a progressively closing slit, and the portion of the lower edge or end surface of the slit-forming blade 12a that extends laterally across and covers the shutter opening 1a to define the progressively closing slit is the center portion 12A. The two extremities or extremity portions of the slit-forming blade 12a, at either end of the center portion 12A, substantially lie outside the perimeter of the shutter opening 1a and do no participate in forming the slit. Thus the degree of linearity of the center portion 12A greatly affects the amount of exposure. Accordingly, if the end surface center portion 12A repeatedly collides against the resilient stopping members 20a and 20b, wear will be produced, creating recesses in the portions that abut against the resilient stopping members 20a and 20b. The amount of exposure will differ between these portions and the other portion of the end surface 12A that does not abut against the stopping members. As a consequence, the amount of exposure will be affected thereby altering the exposure accuracy. Therefore, wear of the end surface center portion 12A should be reduced to a minimum to stabilize the amount of exposure. This is achieved according to the present invention by mounting the resilient stopping members 20a and 20b outside of the center portion 12A of the lower end surface of the slit-forming blade 12a to prevent the stopping members from making resilient contact with the slit-forming end surface 12A when the closing blades 12 are in their shutter-closing positions.

By this structure, when the closing blades 12 move into their shutter-closing positions and make resilient contact with the resilient stopping members 20a and 20b, the members 20a and 20b collide with the outer extremities of the lower end surface of the slit-forming blade 12a and do not collide with the slit-forming end surface center portion 12A. The impact force produced by resilient contact with the resilient stopping member 20a exerts a clockwise (rightward) force on the connector portions 13a and 15a, whereas the impact force produced by resilient contact with the resilient stopping member 20b exerts a counterclockwise (leftward) force on the connector portions 13a and 15a. Therefore, the rotating force directed to the right and the rotating force directed to the left cancel out each other. As a consequence, no substantial extra force acts on the connector portions 13a and 15a, thereby reducing if not eliminating eccentric wear of the connector portions 13a and 15 which would otherwise be produced. Accordingly, the slit-forming end surface 12A is prevented from being damaged. Also, this structure is useful in enhancing the durability of the connector portions 13a and 15a.

If the focal-plane shutter of the construction described above is a double-shielding type, the set of opening blades 2 and the set of closing blades 12 both cover the shutter opening 1a in the initial state. Thus, double optical shielding is provided. Under this condition, when the camera release switch (not shown) is depressed, an electric motor rotates a set lever (not shown) to retract the set of closing blades 12 from the shutter opening 1a and position the closing blades 12 at their retracted, shutter-opening positions shown in FIG. 3. At this time, the shutter opening 1a is single shielded only by the set of opening blades 2 as shown in FIG. 1. Under this condition, the set of closing blades 12 and the set of opening blades 2 are attracted to closing and opening electromagnets, respectively, and held stationary. This is a pre-exposure state in which the shutter is cocked or charged in readiness for taking an exposure.

Under this condition, when the opening electromagnet attracting the set of opening blades 2 is deenergized, the resilient force of the spring holding the blades 2 momentarily retracts the blades 2 from the shutter opening 1a and displaces them downwardly into their shutter-opening positions shown in FIG. 2. Since the movements of the opening blades 2 into the shutter-opening positions are made instantly by the resilient force of the spring, the opening blades 2 collide against the resilient stopping members 10a and 10b and come to a stop. As mentioned previously, the resilient stopping members 10a and 10b are mounted on opposite sides of the connector portions 3a and 5a. Therefore, reaction forces produced in response to collision of the opening blades 2 against the resilient stopping members 10a and 10b act on the connector portions 3a and 5a so as to cancel out each other. Consequently, a force large enough to damage the connector portions 3a and 5a is not produced.

At this moment, both the closing blades 12 and opening blades 2 are retracted from the shutter opening 1a, thus fully opening it. Under this exposure condition, the closing electromagnet is deenergized after a lapse of a given time. The resilient force of the springs holding the closing blades 12 momentarily causes the closing blades 12 to cover the shutter blade 1a and arrive at the shutter-closing positions shown in FIG. 4, thereby completing the exposure and ending one frame of photography. Since the movements of the closing blades 12 into the closing positions are made instantly by the resilient force of the springs, the closing blades 12 collide against the resilient stopping members 20a and 20b and come to a stop. As mentioned previously, the resilient stopping members 20a and 20b are mounted on opposite sides of the connector portions 13a and 15a and spaced apart from each other. The stopping members 20a and 20b are so located that they do not make resilient contact with the slit-forming end surface 12A. Reaction forces produced in response to collision of the closing blades 12 against the resilient stopping members 20a and 20b act on the connector portions 13a and 15a so as to cancel out each other. Consequently, no force that is large enough to damage the connector portions 13a and 15a is produced. Also, the slit-forming end surface 12A is not damaged. The state in which the shutter opening 1a is covered by the closing blades 12 and the opening blades 2 are retracted from the shutter opening 1a occurs immediately after exposure.

Then, the motor rotates the set lever and moves the opening blades 2 to their shutter-closing positions to again close or cover the shutter opening 1a. In this way, the initial state in which both the closing blades 12 and the opening blades 2 cover the shutter opening 1a to provide double optical shielding is regained.

The illustrated embodiment shows a focal-plane shutter embodying the invention in conjunction with both the set of opening blades 2 (FIGS. 1–2) and the set of closing blades 12 (FIGS. 3–4). However, the invention is not so limited, and a focal-plane shutter according to the present invention may embody the invention in conjunction with only the set of opening blades, or in conjunction with only the set of closing blades, and not necessarily in conjunction with both sets of blades.

In the illustrated embodiment, there are provided two resilient stopping members 10a and 10b for the opening blades 2. The invention is not limited to this structure. More than two resilient stopping members may be provided. In such case, the opening blades 2 are so positioned that, when they collide against the resilient stopping members and come to a stop, reaction forces to the impact forces act on the connector portions 3a and 5a, leading to the overall result that the reaction forces cancel out each other.

As described thus far, in the focal-plane shutter of this invention, resilient stopping members are positioned to make resilient contact with blades on opposite sides of connector portions that connect the blades with the arms. Therefore, impact forces produced on collision with the resilient stopping members cancel out each other at the connector portions. No extra force acts on the connector portions. Consequently, no eccentric wear occurs on the connector portions. Hence, the durability can be enhanced. Furthermore, since the resilient stopping members for the closing blades are so located that the resilient stopping members make resilient contact with the extremity portions of the stopping members which do not pass over the shutter opening, the end surface forming a slit and affecting the amount of exposure is not damaged, even if the closing blades repeatedly collide against the resilient stopping members. The exposure accuracy can thus be maintained, and the durability can be enhanced.

What is claimed is:

1. A focal-plane shutter comprising:
   a shutter plate having a shutter opening;
   a plurality of opening blades for opening and closing the shutter opening;
   arms connected by connector portions to the opening blades for driving the opening blades parallel to the shutter opening; and
   resilient stopping members disposed to make resilient contact with the opening blades at opening positions thereof where the opening blades are retracted from the shutter opening, the resilient stopping members being plural in number and being positioned to make resilient contact with the opening blades on opposite sides of the connector portions.

2. A focal-plane shutter comprising:
   a shutter plate having a shutter opening;
   a plurality of closing blades for opening and closing the shutter opening;
   arms connected by connector portions to the closing blades for driving the closing blades parallel to the shutter opening; and
   resilient stopping members disposed to make resilient contact with the closing blades at closing positions thereof where the closing blades close the shutter opening, the resilient stopping members being plural in number and being positioned to make resilient contact with the closing blades on opposite sides of the connector portions.

3. A focal-plane shutter according to claim 2; wherein the closing blades make resilient contact with the resilient stopping members at portions of the closing blades that do not pass over the shutter opening.

4. A focal-plane shutter comprising: a shutter plate having a shutter opening; a plurality of opening blades displaceable in an opening direction to a shutter-opening position wherein the opening blades do not cover the shutter opening and displaceable in a closing direction to a shutter-closing position wherein the opening blades cover the shutter opening, the plurality of opening blades including a slit-forming blade and one or more cover blades; arms pivotally connected to the opening blades by connector portions for displacing the opening blades to the shutter-opening and shutter-closing positions; and at least two resilient stopping members disposed to make resilient contact with the opening blades when the opening blades are displaced to the shutter-opening position, the at least two resilient stopping members being positioned on opposite sides of the particular connector portions connecting the slit-forming blade to the arms when the opening blades are in the shutter-opening position.

5. A focal-plane shutter according to claim 4; wherein the number of resilient stopping members is two.

6. A focal-plane shutter according to claim 5; wherein the two resilient stopping members are positioned on opposite sides of the particular connector portions with respect to imaginary planes which pass through respective ones of the particular connector portions and which extend parallel to the opening direction of displacement of the opening blades.

7. A focal-plane shutter according to claim 4; wherein the at least two resilient stopping members are positioned on opposite sides of the particular connector portions with respect to imaginary planes which pass through respective ones of the particular connector portions and which extend parallel to the opening direction of displacement of the opening blades.

8. A focal-plane shutter comprising: a shutter plate having a shutter opening; a plurality of closing blades displaceable in a closing direction to a shutter-closing position wherein the closing blades cover the shutter opening and displaceable in an opening direction to a shutter-opening position wherein the closing blades do not cover the shutter opening, the closing blades including a slit-forming blade and one or more cover blades; arms pivotally connected to the closing blades by connector portions for displacing the closing blades to the shutter-closing and shutter-opening positions; and at least two resilient stopping members disposed to make resilient contact with the closing blades when the closing blades are displaced to the shutter-closing position, the at least two resilient stopping members being positioned on opposite sides of the particular connector portions connecting the slit-forming blade to the arms when the closing blades are in the shutter-closing position.

9. A focal-plane shutter according to claim 8; wherein the number of resilient stopping members is two.

10. A focal-plane shutter according to claim 9; wherein the two resilient stopping members are positioned on opposite sides of the particular connector portions with respect to imaginary planes passing through respective ones of the particular connector portions and extending parallel to the closing direction of displacement of the closing blades.

11. A focal-plane shutter according to claim 8; wherein the at least two resilient stopping members are positioned on opposite sides of the particular connector portions with respect to imaginary planes passing through respective ones of the particular connector portions and extending parallel to the closing direction of displacement of the closing blades.

12. A focal-plane shutter according to claim 11; wherein the slit-forming blade has a lower edge center portion which passes over the shutter opening during displacement of the closing blades and two lower edge extremity portions on opposite sides of the lower edge center portion and which do not pass over the shutter opening during displacement of the closing blades; and wherein the at least two resilient stopping members are positioned to make resilient contact with the lower edge extremity portions but not the lower edge center portion of the slit-forming blade.

13. A focal-plane shutter according to claim 8; wherein the slit-forming blade has a lower edge center portion which passes over the shutter opening during displacement of the closing blades and two lower edge extremity portions on opposite sides of the lower edge center portion and which do not pass over the shutter opening during displacement of the closing blades; and wherein the at least two resilient stopping members are positioned to make resilient contact with the lower edge extremity portions but not the lower edge center portion of the slit-forming blade.

14. A focal-plane shutter comprising: a shutter plate having a shutter opening; a plurality of opening blades displaceable in an opening direction to a shutter-opening position wherein the opening blades do not cover the shutter opening and displaceable in a closing direction to a shutter-closing position wherein the opening blades cover the shutter opening, the plurality of opening blades including a slit-forming blade and one or more cover blades; first arms pivotally connected to the opening blades by first connector portions for displacing the opening blades to the shutter-opening and shutter-closing positions; at least two first resilient stopping members disposed to make resilient contact with the opening blades when the opening blades are displaced to the shutter-opening position, the at least two first resilient stopping members being positioned on opposite sides of the particular first connector portions connecting the slit-forming blade to the first arms when the opening blades are in the shutter-opening position; a plurality of closing blades displaceable in a closing direction to a shutter-closing position wherein the closing blades cover the shutter opening and displaceable in an opening direction to a shutter-opening position wherein the closing blades do not cover the shutter opening, the closing blades including a slit-forming blade and one or more cover blades; second arms pivotally connected to the closing blades by second connector portions for displacing the closing blades to the shutter-closing and shutter-opening positions; and at least two second resilient stopping members disposed to make resilient contact with the closing blades when the closing blades are displaced to the shutter-closing position, the at least two second resilient stopping members being positioned on opposite sides of the particular second connector portions connecting the slit-forming blade to the second arms when the closing blades are in the shutter-closing position.

15. A focal-plane shutter according to claim 4; wherein the at least two first resilient stopping members are positioned on opposite sides of the particular first connector portions with respect to imaginary planes which pass through respective ones of the particular first connector portions and which extend parallel to the opening direction of displacement of the opening blades.

16. A focal-plane shutter according to claim 15; wherein the at least two second resilient stopping members are positioned on opposite sides of the particular second connector portions with respect to imaginary planes passing through respective ones of the particular second connector portions and extending parallel to the closing direction of displacement of the closing blades.

17. A focal-plane shutter according to claim 16; wherein the closing slit-forming blade has a lower edge center portion which passes over the shutter opening during displacement of the closing blades and two lower edge extremity portions on opposite sides of the lower edge center portion and which do not pass over the shutter opening during displacement of the closing blades; and wherein the at least two second resilient stopping members are positioned to make resilient contact with the lower edge extremity portions but not the lower edge center portion of the closing slit-forming blade.

18. A focal-plane shutter according to claim 14; wherein the closing slit-forming blade has a lower edge center portion which passes over the shutter opening during displacement of the closing blades and two lower edge extremity portions on opposite sides of the lower edge center portion and which do not pass over the shutter opening during displacement of the closing blades; and wherein the at least two second resilient stopping members are positioned to make resilient contact with the lower edge extremity portions but not the lower edge center portion of the closing slit-forming blade.

19. A focal-plane shutter according to claim 14; wherein the number of first resilient stopping members is two.

20. A focal-plane shutter according to claim 14; wherein the number of second resilient stopping members is two.

* * * * *